US011189886B2

(12) United States Patent
Watanabe et al.

(10) Patent No.: US 11,189,886 B2
(45) Date of Patent: Nov. 30, 2021

(54) STACK-TYPE NONAQUEOUS ELECTROLYTE SECONDARY BATTERY

(71) Applicant: Panasonic Intellectual Property Management Co., Ltd., Osaka (JP)

(72) Inventors: Hiroki Watanabe, Hyogo (JP); Hitoshi Maeda, Hyogo (JP); Katsutoshi Takeda, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 455 days.

(21) Appl. No.: 16/078,318

(22) PCT Filed: Jan. 23, 2017

(86) PCT No.: PCT/JP2017/002094
§ 371 (c)(1),
(2) Date: Aug. 21, 2018

(87) PCT Pub. No.: WO2017/149991
PCT Pub. Date: Sep. 8, 2017

(65) Prior Publication Data
US 2019/0020009 A1    Jan. 17, 2019

(30) Foreign Application Priority Data

Feb. 29, 2016  (JP) ............................. JP2016-037879

(51) Int. Cl.
*H01M 10/0583* (2010.01)
*H01M 50/463* (2021.01)
(Continued)

(52) U.S. Cl.
CPC ..... *H01M 50/463* (2021.01); *H01M 10/0459* (2013.01); *H01M 10/0583* (2013.01); *H01M 50/116* (2021.01); *H01M 50/40* (2021.01)

(58) Field of Classification Search
None
See application file for complete search history.

(56) References Cited

U.S. PATENT DOCUMENTS

2003/0008206 A1   1/2003  Hong
2008/0280208 A1   11/2008 Naoi et al.
(Continued)

FOREIGN PATENT DOCUMENTS

JP   2001-229979 A   8/2001
JP   2006-66319 A    3/2006
(Continued)

OTHER PUBLICATIONS

International Search Report dated Mar. 14, 2017, issued in counterpart International Application No. PCT/JP2017/002094 (2 pages).

*Primary Examiner* — Haixia Zhang
(74) *Attorney, Agent, or Firm* — Westerman, Hattori, Daniels & Adrian, LLP

(57) ABSTRACT

A stack-type nonaqueous electrolyte secondary battery includes an electrode stack. The electrode stack is housed in an exterior body and includes a plurality of positive electrodes, a plurality of negative electrodes, and a separator. The positive electrodes and the negative electrodes are alternately arranged. The separator includes a fanfold portion including a plurality of intervening elements interposed between the positive electrodes and the negative electrodes. The separator includes a wrapper portion at a portion continuous with the fanfold portion. The wrapper portion extends out of the electrode stack and is disposed to cover at least part of a periphery of the electrode stack.

1 Claim, 12 Drawing Sheets

(51) Int. Cl.
*H01M 50/40* (2021.01)
*H01M 50/116* (2021.01)
*H01M 10/04* (2006.01)

(56) References Cited

U.S. PATENT DOCUMENTS

2010/0015529 A1    1/2010   Kim et al.
2011/0104550 A1*   5/2011   Ahn .................. H01M 10/0583
                                                              429/131
2012/0094168 A1    4/2012   Kim et al.

FOREIGN PATENT DOCUMENTS

| | | |
|---|---|---|
| JP | 2008-282739 A | 11/2008 |
| JP | 2012-256610 A | 12/2012 |
| JP | 2013-145678 A | 7/2013 |
| JP | 2013-191485 A | 9/2013 |
| JP | 2013-219057 A | 10/2013 |
| JP | 2015-153690 A | 8/2015 |
| JP | 2016-103425 A | 6/2016 |

* cited by examiner

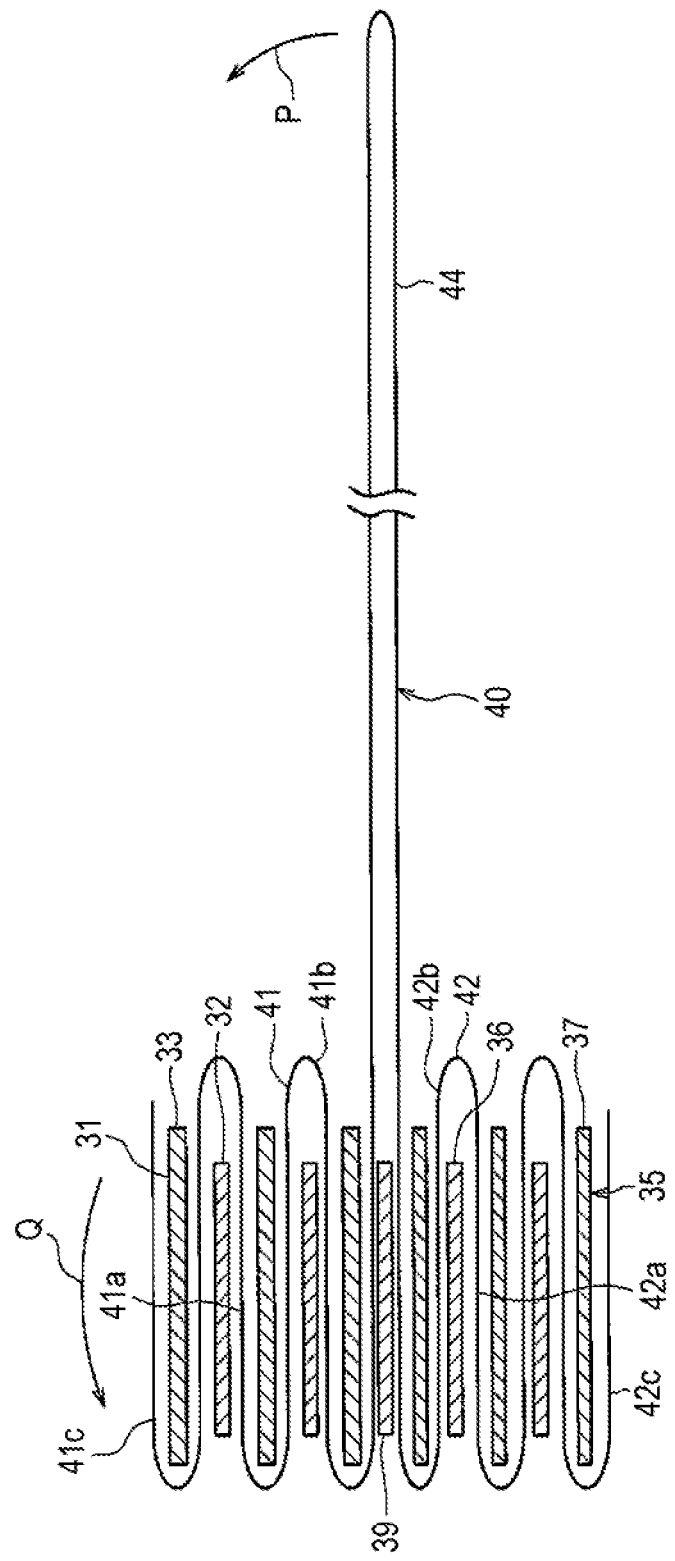

STACK-TYPE NONAQUEOUS ELECTROLYTE SECONDARY BATTERY

TECHNICAL FIELD

The present invention relates to a stack-type nonaqueous electrolyte secondary battery.

BACKGROUND ART

A stack-type nonaqueous electrolyte secondary battery including an electrode stack formed by stacking multiple pairs of electrodes is known. Examples of such a secondary battery include a lithium-ion battery including multiple positive electrodes, negative electrodes, and separators, and having the positive and negative electrodes being alternately stacked with the separators interposed therebetween. In a lithium-ion battery having a stack-type electrode structure, the electrodes are likely to cause, with their expansion and contraction after electric charging and discharging, stress uniformly in the direction in which the electrodes are stacked. Compared to, for example, a winding electrode structure, the stack-type electrode structure reduces distortion of the electrode unit and enhances, for example, uniformization of the cell reaction or an increase of the battery life.

PTL 1 discloses a structure of a stack-type secondary battery including electrode stacks and a fanfold separator disposed at the individual stacks. Multiple portions of the separator are interposed between the multiple positive electrodes and the negative electrodes. The positive electrodes and the negative electrodes are alternately stacked with the separator interposed therebetween.

PTL 2 discloses a structure of a stack-type secondary battery including an electrode stack and a rectangular electrode stack support body disposed at the center of the electrode stack to support the electrode stack. The electrode stack support body has a projection facing a battery lid. The projection is fitted into a groove formed in the battery lid. PTL 2 describes that this structure fixes the position of the electrode stack support body in a battery container to prevent the electrode stack from moving in the battery.

CITATION LIST

Patent Literature

PTL 1: Japanese Published Unexamined Patent Application No. 2012-256610
PTL 2: Japanese Published Unexamined Patent Application No. 2006-66319

SUMMARY OF INVENTION

When receiving vibrations or shocks from the exterior, a stack-type secondary battery may cause a stacked electrode displacement, which is a displacement between the stacked electrodes. In the structure described in, for example, PTL 1, the positive electrode plates and the negative electrode plates are fixed against displacement in none of three directions perpendicular to each other, including the electrode stack direction. This structure is more likely to cause a stacked electrode displacement upon receipt of vibrations and shocks. A stacked electrode displacement may cause the positive electrode plates or the negative electrode plates to collide with an exterior body. The above-described structure thus has room for improvement in terms of short-circuit prevention and durability enhancement.

The structure described in PTL 2 as a technology to fix an electrode stack inside the battery requires a relatively thick electrode stack support body for securing rigidity. The above electrode stack support body fails to retain a nonaqueous electrolyte such as an electrolyte solution. This structure may thus reduce the battery capacity and the amount of the retained nonaqueous electrolyte.

A stack-type nonaqueous electrolyte secondary battery according to an aspect of the present disclosure includes an electrode stack housed in an exterior body and including a plurality of positive electrodes, a plurality of negative electrodes, and a separator. The positive electrodes and the plurality of negative electrodes are alternately arranged. The separator includes a fanfold portion including a plurality of intervening elements interposed between the positive electrodes and the negative electrodes. The separator includes a wrapper portion at a portion continuous with the fanfold portion. The wrapper portion extends out of the electrode stack and is disposed to cover at least part of a periphery of the electrode stack.

An aspect of the present disclosure achieves a stack-type nonaqueous electrolyte secondary battery capable of preventing a displacement between stacked electrodes without excessively reducing the battery capacity and the amount of a retained nonaqueous electrolyte.

BRIEF DESCRIPTION OF DRAWINGS

FIG. 12 illustrates another exemplary embodiment.

DESCRIPTION OF EMBODIMENTS

Figure 1:
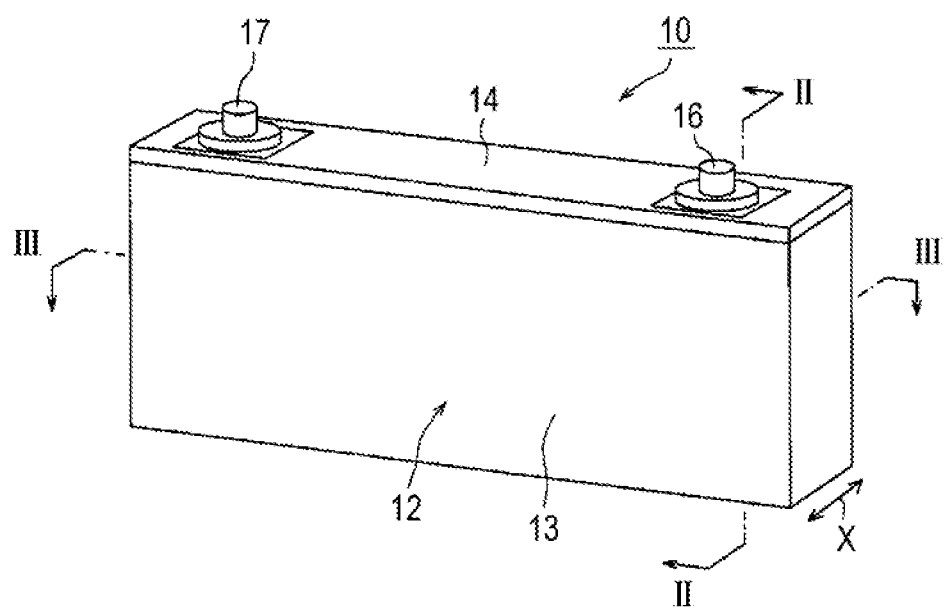
FIG. 1 is a perspective view of the external appearance of a stack-type nonaqueous electrolyte secondary battery according to an exemplary embodiment.

Hereinbelow, a stack-type nonaqueous electrolyte secondary battery according to an exemplary embodiment is described in detail. The drawings that are referred to in the description of embodiments are only schematic, and dimensional ratios between components and other details in the drawings may differ from the actual ones. Specific dimensional ratios and other details are to be determined in consideration of the following description. In the present description, the word "substantially" in combination with, for example, the same is intended to include the meaning of substantially regarded as the same, to say nothing of completely the same. The wording "end portion" is intended to include the meaning of an end of an object and the vicinity of the end. The shape, the material, the number, and other properties described in the following description are only exemplary, and may be changed depending on the specification of a secondary battery. The same components are denoted with the same reference numerals, below.

A stack-type nonaqueous electrolyte secondary battery described below is used for, for example, a power supply for driving an electric vehicle or a hybrid car or a stationary electricity storage system provided for shifting peak demand of the publicly distributed electricity. The stationary electricity storage system is used for reducing output fluctuations of power generation, such as solar power generation or wind power generation, or to store electricity at nighttime for use in daytime.

Figure 2:
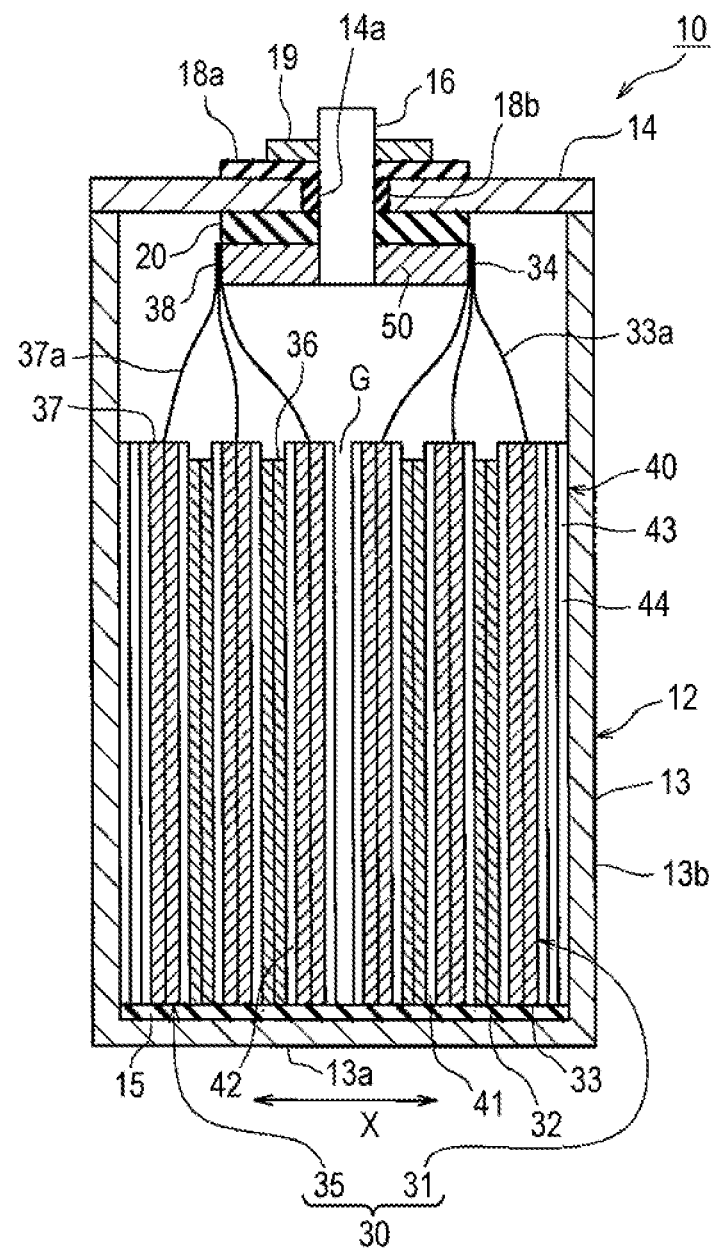
FIG. 2 schematically illustrates the section taken along line II-II of FIG. 1.
Figure 3:
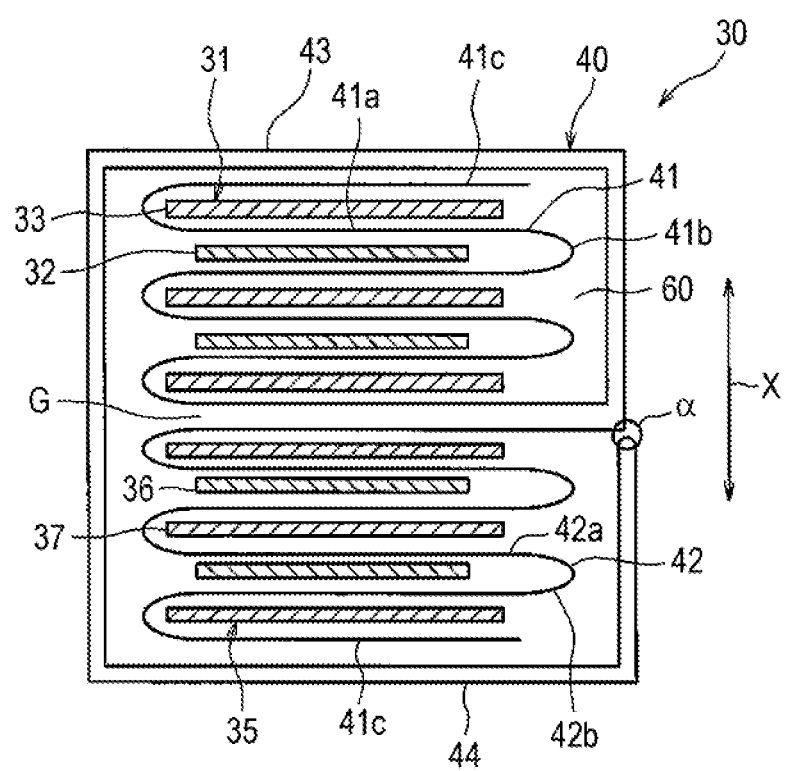
FIG. 3 schematically illustrates the section taken along line III-III of FIG. 1.

A stack-type nonaqueous electrolyte secondary battery 10 according to an exemplary embodiment is described in detail below, with reference to FIGS. 1 to 6. The stack-type nonaqueous electrolyte secondary battery 10 is described as a secondary battery 10, below. FIG. 1 is a perspective view of the external appearance of the secondary battery 10. FIG. 2 schematically illustrates the section taken along line II-II of FIG. 1. FIG. 3 schematically illustrates the section taken along line III-III of FIG. 1. For convenience of illustration, the side of a case 12 facing a cover plate 14 is described as an upper side, and the side of the case 12 facing away from the cover plate 14 is described as a lower side, below.

The secondary battery 10 includes a case 12, serving as an exterior body, and an electrode unit 30, housed in the case 12 and serving as a power generator. The case 12 holds an electrolyte solution 60 (FIG. 3), corresponding to a non-aqueous electrolyte describe below. The case 12 has an upper end portion, on which a negative electrode terminal 16 protrudes from a first end portion (right end portion in FIG. 1) of the upper end in the longitudinal direction, and a positive electrode terminal 17 protrudes from a second end portion (left end portion in FIG. 1) of the upper end in the longitudinal direction.

The electrode unit 30 includes two electrode stacks, a first electrode stack 31 and a second electrode stack 35, and the two electrode stacks 31 and 35 face each other with a gap G interposed therebetween. The two electrode stacks 31 and 35 are electrically connected in parallel, and housed in the case 12 while being immersed in the electrolyte solution 60.

The first electrode stack 31 is disposed on one side of the electrode unit 30 in the electrode stack direction X (right side in FIG. 2 or upper side in FIG. 3). The second electrode stack 35 is disposed on another side of the electrode unit 30 in the electrode stack direction X (left side in FIG. 2 or lower side in FIG. 3), adjacent to the first electrode stack 31.

The first electrode stack 31 includes multiple positive electrodes 32 and multiple negative electrodes 33, arranged alternately, and a part of a separator 40. The first electrode stack 31 has a so-called stacked electrode structure, in which the positive electrodes 32 and the negative electrodes 33 are alternately stacked with the part of the separator 40 interposed therebetween.

The second electrode stack 35 includes multiple positive electrodes 36 and multiple negative electrodes 37, arranged alternately, and another part of a separator 40. The second electrode stack 35 has a so-called stacked electrode structure, in which the positive electrodes 36 and the negative electrodes 37 are alternately stacked with the part of the separator 40 interposed therebetween. The single separator 40 extends over both the first electrode stack 31 and the second electrode stack 35. The positive electrodes 36 of the second electrode stack 35 correspond to second positive electrodes, and the negative electrodes 37 of the second electrode stack 35 correspond to second negative electrodes.

As illustrated in FIG. 3, the separator 40 includes a first fanfold portion 41, a second fanfold portion 42, and a wrapper portion 43 disposed at a portion that connects the two fanfold portions 41 and 42 together. The first fanfold portion 41 includes multiple flat intervening elements 41a, interposed between the positive electrodes 32 and the negative electrodes 33 of the first electrode stack 31, and coupling portions 41b, each of which couples adjacent intervening elements 41a together. The second fanfold portion 42 includes multiple flat intervening elements 42a, interposed between the positive electrodes 36 and the negative electrodes 37 of the second electrode stack, and coupling portions 42b, each of which couples adjacent intervening elements 42a together. The intervening elements 42a interposed between the positive electrodes 36 and the negative electrodes 37 of the second electrode stack 35 correspond to second intervening elements.

The separator 40 is formed of an ion-permeable and insulating porous sheet. A preferable example of the secondary battery 10 is a lithium-ion battery. The wrapper portion 43 is disposed to connect the fanfold portions 41 and 42 together, extends outward beyond the electrode stacks 31 and 35, and is wrapped around the electrode unit 30 to cover substantially the entire periphery of the electrode unit 30. This structure prevents a displacement between stacked electrodes without excessively reducing the battery capacity and the amount of the retained electrolyte solution (retained liquid amount), as described below. The wrapper portion 43 is described below in detail.

As illustrated in FIG. 1, the case 12 includes a case body 13, having a substantially box shape, and a cover plate 14, serving as a sealing body that closes the upper end opening of the case body 13. The case body 13 and the cover plate 14 are made of a metal containing, for example, aluminum as a main component. The case body 13 and the cover plate 14 are bonded together by welding.

In the secondary battery 10, the case 12 is insulated from the positive electrodes 32 and 36 and the negative electrodes 33 and 37, and has an electrically neutral polarity. As illustrated in FIG. 2, an insulating plate 15 may be disposed between the lower end of the electrode unit 30 and a bottom plate portion 13a of the case body 13. The wrapper portion 43 of the separator 40, described below, is disposed between a peripheral wall portion 13b of the case body 13 and the positive electrodes 32 and 36 and the negative electrodes 33 and 37 of the electrode unit 30. This structure prevents a stacked electrode displacement between the positive electrodes 32 and 36 and the negative electrodes 33 and 37, and a short circuit between the case body 13 and the positive and negative electrodes. The electrode unit 30 may be housed in a box-shaped holder having an upper end open, without including the insulating plate 15 on the bottom plate portion 13a.

All the positive electrodes 32 and 36 and the negative electrodes 33 and 37 forming the electrode stacks 31 and 35 of the electrode unit 30 have, for example, a substantially rectangular shape in a plan view. The positive electrodes 32 and 36 respectively include positive electrode tabs 32a and 36a (see FIGS. 5 and 6, below) at a second end portion (end portion on the back side of FIG. 2) of the positive electrodes 32 and 36 in the longitudinal direction (front-back direction of the plane of FIG. 2). The negative electrodes 33 and 37 respectively include negative electrode tabs 33a and 37a at a first end portion (end portion on the front side of FIG. 2) of the negative electrodes 33 and 37 in the longitudinal direction. In an embodiment, the positive electrode tabs 32a and 36a and the negative electrode tabs 33a and 37a extend from a first end (upper end in FIG. 2) of the electrode stacks 31 and 35 in the width direction (vertical direction in FIG. 2), perpendicular to the longitudinal direction of the electrode stacks 31 and 35.

Each of the positive electrodes 32 and 36 includes, for example, a rectangular positive electrode core and positive electrode composite layers on the core. The positive electrode core may be formed of, for example, metal foil stable at positive electrode potentials such as aluminum, or a film having the metal on the surface layer. The positive electrode tabs are, for example, protruding portions of each positive electrode core and integrated with the positive electrode core. The positive electrode active material layers of the positive electrode composite layers are disposed on the positive electrode core. The positive electrode composite layers preferably contain, besides the positive electrode active material, an electrically conducting material and a binder, and are disposed on both surfaces of the positive electrode core. The positive electrodes 32 and 36 are manufactured by, for example, applying, to the positive electrode core, positive electrode composite slurry containing a positive electrode active material and a binder, drying the applied material, and rolling the resultant to form positive electrode composite layers on both surfaces of the positive electrode core.

A lithium-containing composite oxide is used as an example of the positive electrode active material. The lithium-containing composite oxide is not limited to a particular one, but is preferably a composite oxide corresponding to a general formula $Li_{1+x}M_aO_{2+b}$ (wherein x+a=1, −0.2<x0.2, −0.1≤b≤0.1, and M contains at least one of Ni, Co, Mn, and Al). A preferable example of a composite oxide is a Ni—Co—Mn-based or Ni—Co—Al-based lithium-containing composite oxide.

Each of the negative electrodes 33 and 37 includes, for example, a rectangular negative electrode core, and a negative electrode composite layer disposed on the core. The negative electrode core may be formed of, for example, metal foil stable at negative electrode potentials such as copper or a film having the metal on the surface layer. The negative electrode tabs 33a and 37a are, for example, protruding portions of each negative electrode core and integrated with the negative electrode core. The negative electrode active material layers of the negative electrode composite layers are disposed on the negative electrode core. The negative electrode composite layers preferably contain a binder besides the negative electrode active material. The negative electrodes 33 and 37 are manufactured by, for example, applying, to the negative electrode core, negative electrode composite slurry containing a negative electrode active material, a binder, and other materials, drying the applied material, and rolling the resultant to form negative electrode composite layers on both surfaces of the negative electrode core.

Any material that can occlude and discharge lithium ion is usable as the negative electrode active material, typically, graphite is used. Silicon, a silicon compound, or a mixture of these may be used as the negative electrode active material. A silicon compound or the like and a carbon material such as graphite may be used together. A silicon compound or the like can occlude a larger amount of lithium ion than a carbon material such as graphite. Thus, use of these materials as the negative electrode active material can enhance the energy density of the battery. A preferable example of the silicon compound is a silicon oxide expressed by $SiO_x$ (0.5≤x≤1.5). $SiO_x$ preferably has its particle surface coated with a conducting coat such as amorphous carbon.

The electrolyte solution 60 is a liquid electrolyte containing a nonaqueous solvent and electrolyte salt solved in the nonaqueous solvent. Examples of the nonaqueous solvent include an ester solvent, an ether solvent, a nitrile solvent, an amide solvent, and a mixture solvent containing two or more of these solvents. The nonaqueous solvent may contain a halogen substitution product formed by replacing at least part of hydrogen in these solvents with halogen atoms such as fluorine. Electrolyte salt is preferably lithium salt.

The negative electrode tabs 33a and 37a extending from first end portions, in the width direction, of the respective negative electrodes 33 and 37 of the electrode stacks 31 and 35 are stacked together in the electrode stack direction X to form tab stacks 34 and 38. The tab stacks 34 and 38 are joined by welding to both side surfaces, in the electrode stack direction X, of a negative electrode current collector plate 50 illustrated in FIG. 2. The negative electrode current collector plate 50 is made of a metal plate and electrically connected to the negative electrode terminal 16. Thus, the multiple negative electrodes 33 and 37 are electrically connected to the negative electrode terminal 16. The negative electrode current collector plate may be formed of an L-shaped metal plate. The negative electrode current collector plate may have an upper end plate to which a lower end portion of the negative electrode terminal 16 is connected. The negative electrode current collector plate may have a lower end plate having both side surfaces to which the tab stacks 34 and 38 are joined. The upper end plate extends in the horizontal direction, and the lower end plate extends in the vertical direction.

As in the case of the negative electrode tabs 33a and 37a, the positive electrode tabs 32a and 36a (see FIGS. 5 and 6) extending from first end portions, in the width direction, of the respective positive electrodes 32 and 36 of the electrode stacks 31 and 35 are stacked together in the electrode stack direction to form tab stacks (not illustrated). The tab stacks of the positive electrode tabs 32a and 36a are joined to a positive electrode current collector plate (not illustrate) by welding. As in the case of the negative electrode current collector plate, the positive electrode current collector plate is also made of a metal plate. The positive electrode current collector plate is electrically connected to the positive electrode terminal 17 (FIG. 1). Thus, the multiple positive electrodes 32 and 36 are electrically connected to the positive electrode terminal 17.

As illustrated in FIG. 2, through holes 14a are formed at both end portions of the cover plate 14, disposed at the upper end of the case 12, to allow the negative electrode terminal 16 and the positive electrode terminal 17 (FIG. 1) to extend therethrough. The negative electrode terminal 16 and the positive electrode terminal 17 are fixed to the cover plate 14 while being respectively inserted into the through holes 14a in the cover plate 14 with intermediate members 18a and 18b interposed therebetween. Portions of the negative electrode terminal 16 and the positive electrode terminal 17 protruding upward beyond the cover plate 14 are fixed by, for example, screwing upper coupling members 19. An intermediate member 18a is held between each upper coupling member 19 and the cover plate 14. The intermediate members 18a and 18b may be gaskets. The negative electrode terminal 16 and the cover plate 14 are insulated from each other with the corresponding intermediate member serving as a gasket.

The negative electrode terminal 16 has its lower end portion electrically connected to the negative electrode current collector plate 50. The negative electrode current collector plate 50 and the cover plate 14 are insulated from each other with an insulating member 20, made of an insulating material, interposed therebetween. The positive electrode terminal 17 and the cover plate 14 are also insulated from each other with the intermediate member interposed therebetween. The positive electrode terminal 17 has its lower end portion electrically connected to the positive electrode current collector plate. The positive electrode current collector plate and the cover plate 14 are also separated by the insulating member interposed therebetween, as in the case of the negative electrode current collector plate 50. Thus, the case 12 is insulated from the positive electrodes 32 and 36 and the negative electrodes 33 and 37.

One or more circuit breaker systems may be disposed on the negative electrode terminal 16, on the positive electrode terminal 17, or on both. An example usable as the circuit breaker system is a pressure-sensitive circuit breaker system that breaks current in response to a rise of the internal pressure in the battery, which may be installed, for example, on the connection path between the positive electrode current collector plate and the positive electrode terminal 17. Other examples usable as the circuit breaker system include a fuse instead of the pressure-sensitive circuit breaker system.

As illustrated in FIG. 3, the wrapper portion 43 of the separator 40 is formed of a remaining portion 44, which is continuous with the opposing ends of the first fanfold portion 41 and the second fanfold portion 42 and folded over while having both end portions overlapping each other. The remaining portion 44 is wrapped around substantially the entire peripheries of the first electrode stack 31 and the second electrode stack 35 to cover the substantially entire peripheries. The remaining portion 44 has its far end portion connected to the base portion of the remaining portion 44, which is the encircled portion α in FIG. 3. For example, the remaining portion 44 has its far end portion and its base portion bonded together by thermal welding or with an insulating tape to form the wrapper portion 43.

Figure 4:
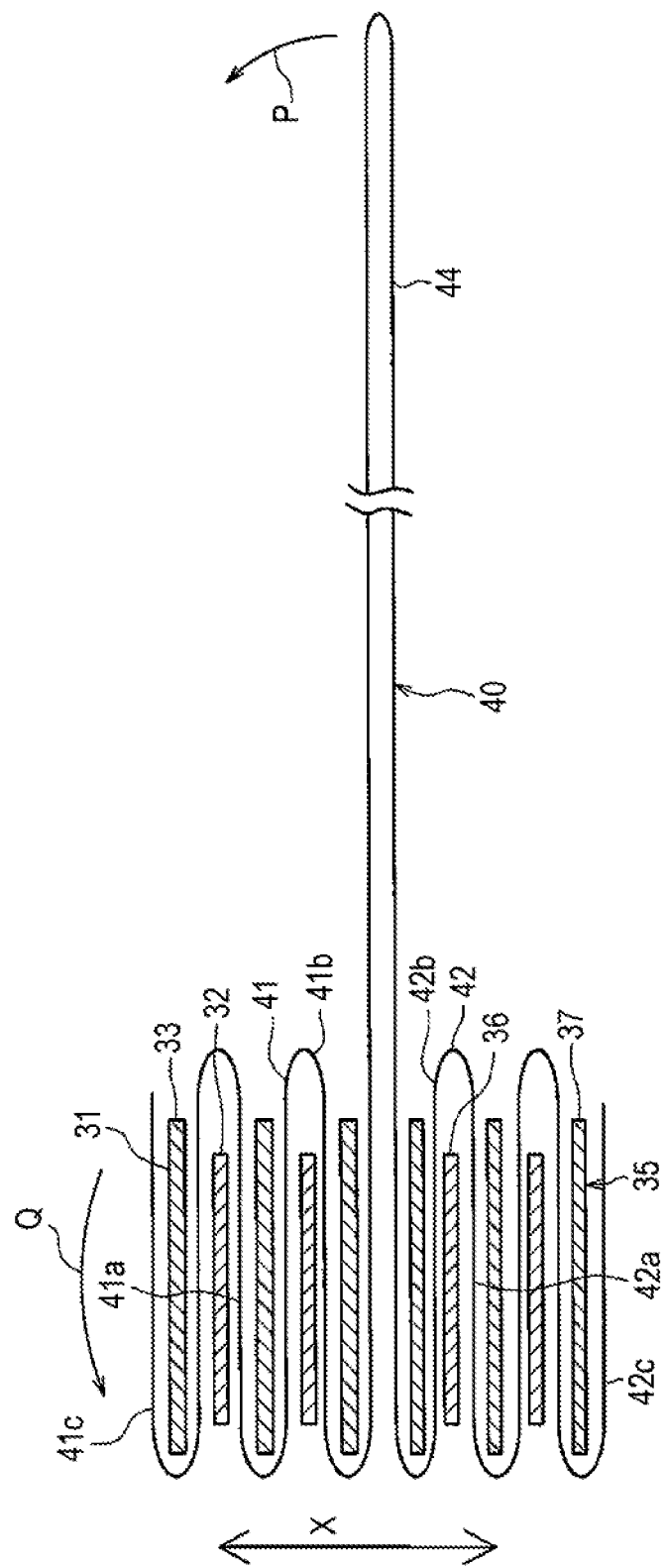
FIG. 4, corresponding to FIG. 3, illustrates a middle portion of a separator forming a wrapper portion, the middle portion extending outward from the electrode stacks.

FIG. 4 illustrates a method for disposing the separator 40 between the positive electrodes 32 and 36 and the negative electrodes 33 and 37, and around the two electrode stacks 31 and 35. FIG. 4, corresponding to FIG. 3, illustrates the remaining portion 44, forming the wrapper portion 43 (FIG. 3) of the separator 40, in the state of extending outward from the electrode stacks 31 and 35.

The separator 40 includes the first fanfold portion 41 and the second fanfold portion 42 on both sides. The first fanfold portion 41 is folded into a fan shape while having the intervening elements 41a interposed between the positive electrodes 32 and the negative electrodes 33 of the first electrode stack 31. The second fanfold portion 42 is folded into a fan shape while having the intervening elements 42a interposed between the positive electrodes 36 and the negative electrodes 37 of the second electrode stack 35. Here, flat end portions 41c and 42c of the respective fanfold portions 41 and 42 are disposed on the outer side of the negative electrodes 33 and 37 at both ends of the two electrode stacks 31 and 35 in the stack direction to cover the outer sides of the negative electrodes 33 and 37.

The separator 40 then has the remaining portion 44 formed to be continuous with the ends of the fanfold portions 41 and 42 disposed between the first electrode stack 31 and the second electrode stack 35 and to extend between the first electrode stack 31 and the second electrode stack 35. The remaining portion 44 extends in the longitudinal direction (lateral direction in FIG. 4) of the positive electrodes 32 and 36 and the negative electrodes 33 and 37. The remaining portion 44 has a flat thin sheet bent into a U shape and having both ends coupled to the ends of the fanfold portions 41 and 42. The remaining portion 44 is bent in the direction indicated with arrow P in FIG. 4 and wrapped around the first electrode stack 31 and the second electrode stack 35 in one direction (direction indicated with arrow Q in FIG. 4). As illustrated in FIG. 3, coupling the far end portion of the remaining portion 44 to the base portion of the remaining portion 44 with an insulating tape or the like forms the wrapper portion 43. The wrapper portion 43 is thus formed by covering substantially the entire peripheries of the two electrode stacks 31 and 35 with the remaining portion 44, which is continuous with the first fanfold portion 41 and the second fanfold portion 42 and folded over while having both end portions overlapping each other.

Figure 5:
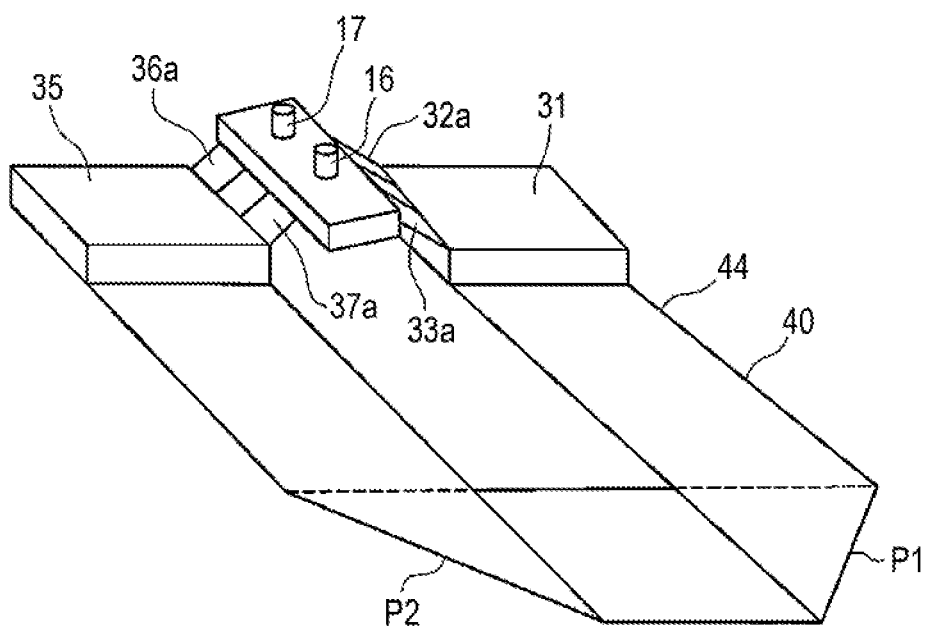
FIG. 5 is a perspective view illustrating an example of a method for manufacturing an electrode terminal connection structure including two electrode stacks connected to terminals fixed to a cover plate, in a state where the two electrode stacks are unfolded to expand laterally and in a state where a remaining portion of the separator protruding beyond the electrode stacks is folded over.
Figure 6:
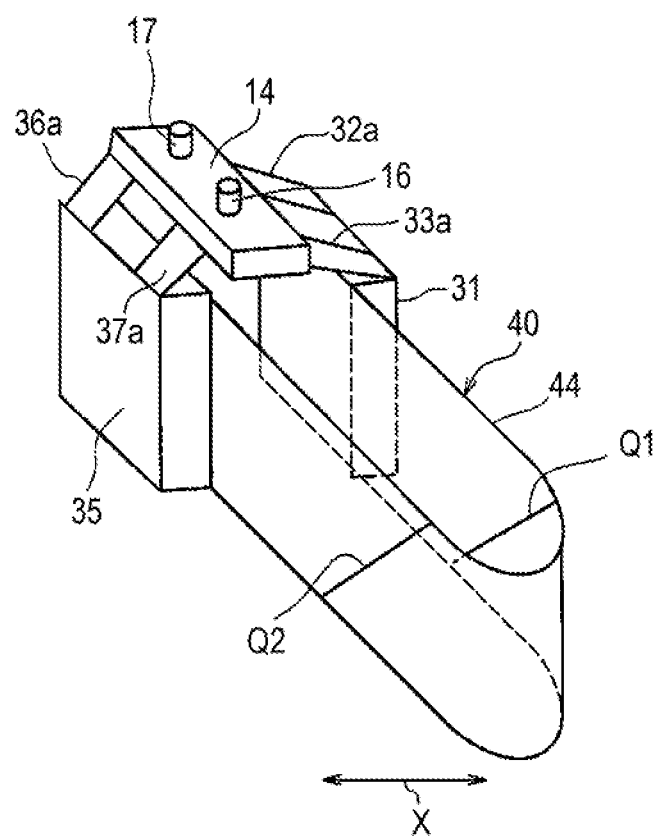
FIG. 6 is a perspective view of the two electrode stacks raised from the state illustrated in FIG. 5 to face each other in the electrode stack direction and the remaining portion of the separator raised into a U shape.

FIG. 5 illustrates an example of a method for manufacturing an electrode terminal connection structure including the two electrode stacks 31 and 35 connected to the terminals 16 and 17 fixed to the cover plate 14. FIG. 5 is a perspective view of the two electrode stacks 31 and 35 unfolded to extend in the lateral direction, and the separator 40 having the remaining portion 44, which extends from the electrode stacks 31 and 35, folded over. FIG. 6 is a perspective view of the two electrode stacks 31 and 35 raised from the state of FIG. 5 to face each other in the electrode stack direction X, and the remaining portion 44 of the separator 40 raised into the U shape.

As illustrated in FIG. 2, the negative electrode tabs 33a and 37a and the positive electrode tabs 32a and 36a are respectively connected to the negative electrode current collector plate 50 and the positive electrode current collector plate (not illustrated). In this case, the tabs 33a, 37a, 32a, and 36a can be welded to the respective current collector plates while the two electrode stacks 31 and 35 are unfolded along the flat surface to extend in the lateral direction, as illustrated in FIG. 5. Here, the positive electrode current collector plate connected to the positive electrode terminal 17 and the negative electrode current collector plate 50 (FIG. 2) connected to the negative electrode terminal 16 are fixed to the cover plate 14. FIG. 5 omits the illustrations of the upper coupling member 19 (FIG. 2) and the intermediate member 18a (FIG. 2). The tabs 33a, 37a, 32a, and 36a may be welded to both surfaces of the corresponding current collector plates in the width direction (lateral direction in FIG. 5) of the cover plate 14 or to the lower surfaces of the corresponding current collector plates.

The fanfold portions 41 and 42 (FIG. 3) of the separator 40 are formed in a Z shape to have the intervening elements 41a and 42a (FIG. 3) interposed between the positive electrodes and the negative electrodes of the electrode stacks 31 and 35. The remaining portion 44, continuous with the fanfold portions 41 and 42, extends outward and are folded over in a flat shape. Here, the remaining portion 44 extends outward from first ends (front ends of the plane of FIG. 5) of the first electrode stack 31 and the second electrode stack 35 in the longitudinal direction, and is folded into a flat letter U shape. Both end portions of the remaining portion 44 linearly extend parallel to each other. The middle portion of the remaining portion 44 is folded along creases P1 and P2, inclined with respect to the direction (front-back direction of the plane of FIG. 5) in which both end portions of the remaining portion 44 extend, and extends in a direction perpendicular to the both end portions.

Subsequently, as illustrated in FIG. 6, while the first electrode stack 31 and the second electrode stack 35 are raised to face each other in the electrode stack direction X, the remaining portion 44 is formed into a U shape to have both side portions facing each other. Here, the creases P1 and P2 formed in FIG. 5, corresponding to straight lines Q1 and Q2 in FIG. 6, are opened for both side portions of the straight lines Q1 and Q2 to extend along a flat surface.

The first electrode stack 31 and the second electrode stack 35 in this state are moved closer to each other, and the remaining portion 44 having both side portions overlapping each other is wrapped around the first electrode stack 31 and the second electrode stack 35. The remaining portion 44 is wrapped around substantially the entire peripheries of the first electrode stack 31 and the second electrode stack 35, and has its far end portion coupled to its base portion to form the wrapper portion 43 (FIG. 3). When the tabs are to be bonded to the current collector plates by welding while the two electrode stacks 31 and 35 are facing each other in the electrode stack direction X, the remaining portion in the state of FIG. 6 may be wrapped around without undergoing the state of FIG. 5.

In the above secondary battery 10, the fanfold portions 41 and 42, disposed in the respective two electrode stacks 31 and 35, and the wrapper portion 43 between the fanfold portions 41 and 42 are connected to form the single continuous separator 40. The wrapper portion 43 wrapped around the two electrode stacks 31 and 35 prevents displacement between the stacked positive and negative electrodes. The wrapper portion 43 is insulated from the outer case 12 and has a function of absorbing shocks from the exterior. This structure prevents vibrations and shocks from the outside of the secondary battery 10 from being transmitted to the electrode stacks 31 and 35 inside, and thus has high resistance to vibrations and shocks.

The separator 40 can retain the electrolyte solution 60 and allows the electrolyte solution 60 to permeate into the electrode stacks 31 and 35 through the separator 40. The separator 40 including the wrapper portion 43 increases the amount of the retained electrolyte solution 60. Unlike the structure described in PTL 2, the embodiment does not require a thick electrode stack support body to fix the electrode stacks inside the battery. This structure thus prevents displacement between stacked electrodes without excessively reducing the battery capacity and the amount of the retained electrolyte solution 60.

The wrapper portion 43 is formed of the remaining portion 44 folded while having both side portions overlapping each other and disposed to cover substantially the entire peripheries of the electrode stacks 31 and 35. Thus, the electrode stacks 31 and 35, wrapped with the overlapping portions of the separator 40, have higher resistance to vibrations and shocks.

Figure 7A:
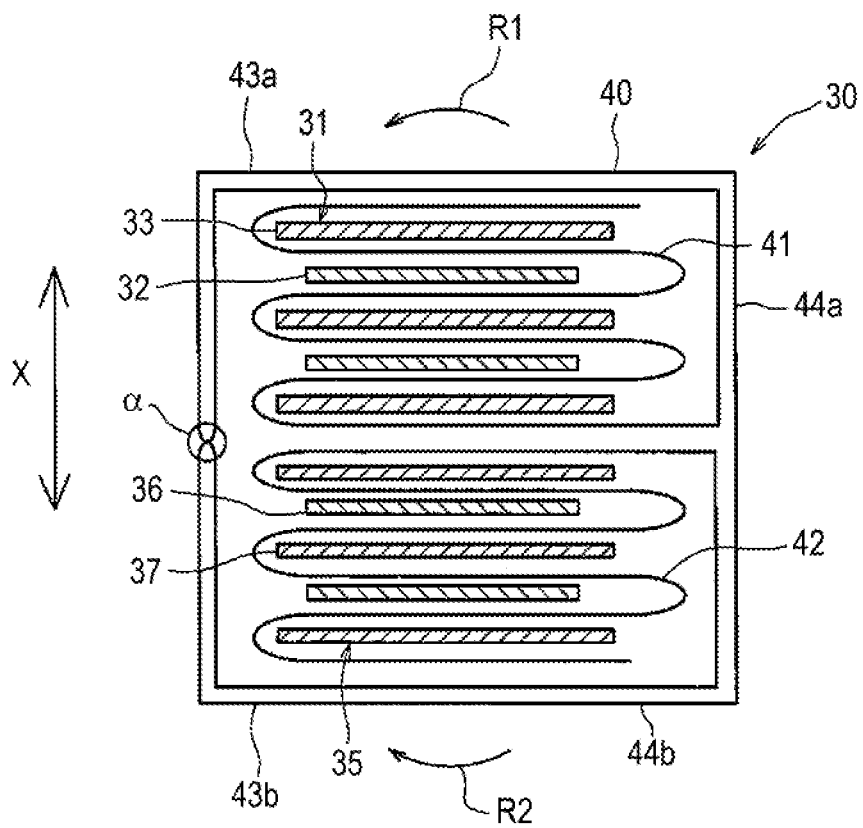
FIG. 7A, corresponding to FIG. 3, illustrates another exemplary embodiment.
Figure 7B:
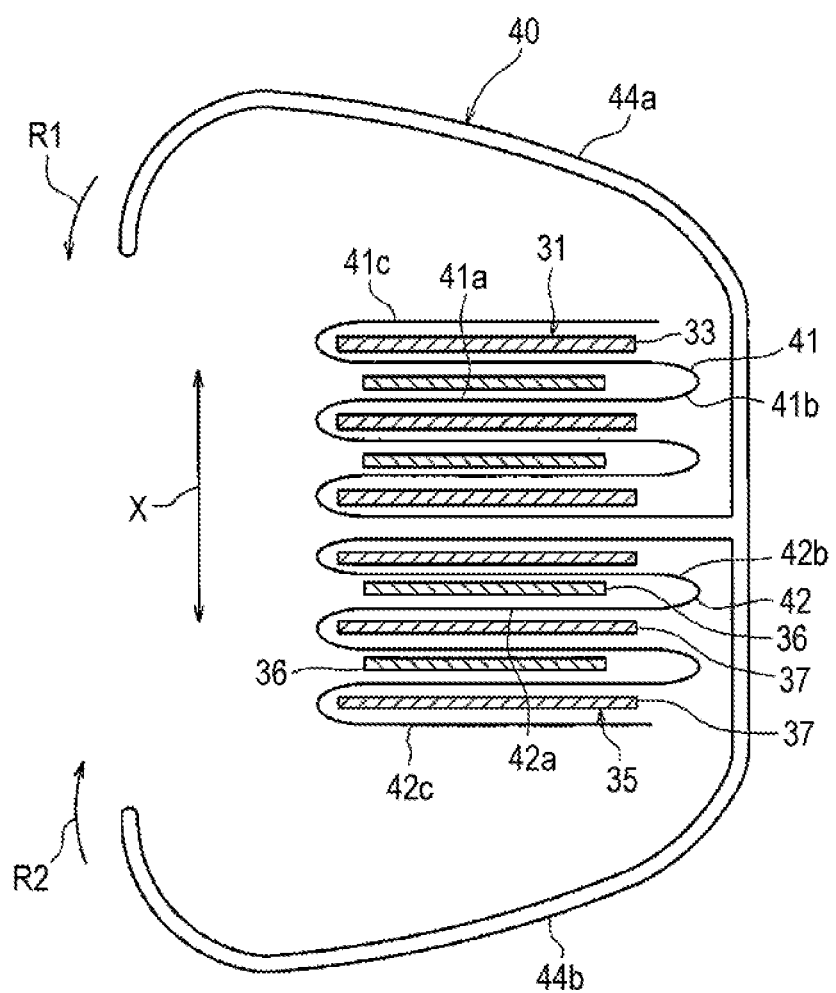
FIG. 7B, corresponding to FIG. 7A, illustrates the remaining portion of the separator in the state illustrated in FIG. 7A forming the wrapper portion, the remaining portion protruding outward from the electrode stacks.

FIG. 7A, corresponding to FIG. 3, illustrates another exemplary embodiment. FIG. 7B illustrates the state where remaining portions 44a and 44b, forming wrapper portions 43a and 43b of the separator 40 in the structure illustrated in FIG. 7A, extend outward from the electrode stacks 31 and 35. In the structure illustrated in FIG. 7A, the separator 40 of the structure illustrated in FIGS. 1 to 6 includes a first wrapper portion 43a and a second wrapper portion 43b. The first wrapper portion 43a and the second wrapper portion 43b are respectively wrapped in opposite directions around the first electrode stack 31 and the second electrode stack 35 from the portions connected with the respective fanfold portions 41 and 42. The far end portions of the two wrapper portions 43a and 43b are bonded together at an encircled portion α in FIG. 7A.

A first remaining portion 44a forms the first wrapper portion 43a. The first remaining portion 44a is connected to the end of a portion of the first fanfold portion 41 at a first end of the first electrode stack 31, the portion of the first fanfold portion 41 extending through a space between the first electrode stack 31 and the second electrode stack 35 in the longitudinal direction of the positive electrodes 32 and 36 and the negative electrodes 33 and 37 (lateral direction of FIG. 7A). The first remaining portion 44a is folded to have both side portions overlapping each other. The first wrapper portion 43a is formed with the first remaining portion 44a wrapped in a first direction (direction of arrow R1 in FIG. 7A) to cover the periphery of the first electrode stack 31.

A second remaining portion 44b forms the second wrapper portion 43b. The second remaining portion 44b is connected to the end of a portion of the second fanfold portion 42 at a first end of the second electrode stack 35, the portion of the second fanfold portion 42 extending through a space between the first electrode stack 31 and the second electrode stack 35 in the longitudinal direction of the positive electrodes 32 and 36 and the negative electrodes 33 and 37 (lateral direction of FIG. 7A). The second remaining portion 44b is folded to have both side portions overlapping each other. The second wrapper portion 43b is formed with the second remaining portion 44b wrapped in the direction opposite to the direction in which the first wrapper portion 43a is wrapped (in the direction of arrow R2 in FIG. 7A) to cover the periphery of the second electrode stack 35. The base portion of the first wrapper portion 43a and the base portion of the second wrapper portion 43b are connected together at the outer peripheral portion. The far end portions of the first wrapper portion 43a and the second wrapper portion 43b are bonded together with, for example, an insulating tape.

To form the separator 40 of the structure in FIG. 7A, as illustrated in FIG. 7B, two remaining portions 44a and 44b are formed to be respectively continuous with the first fanfold portion 41 and the second fanfold portion 42 and extend in the direction opposite to the electrode stack direction X. Then, the remaining portion 44a of the two remaining portions 44a and 44b is wrapped around the first electrode stack 31 in a first direction (direction of arrow R1 in FIG. 7B) to form the first wrapper portion 43a (FIG. 7A). The remaining portion 44b of the two remaining portions 44a and 44b is wrapped around the second electrode stack 35 in a second direction (direction of arrow R2 in FIG. 7B) to form the second wrapper portion 43b (FIG. 7A). Then, the far end portions of the first wrapper portion 43a and the second wrapper portion 43b are bonded together. Other components and functions are the same as those of the structure in FIGS. 1 to 6.

Figure 8:
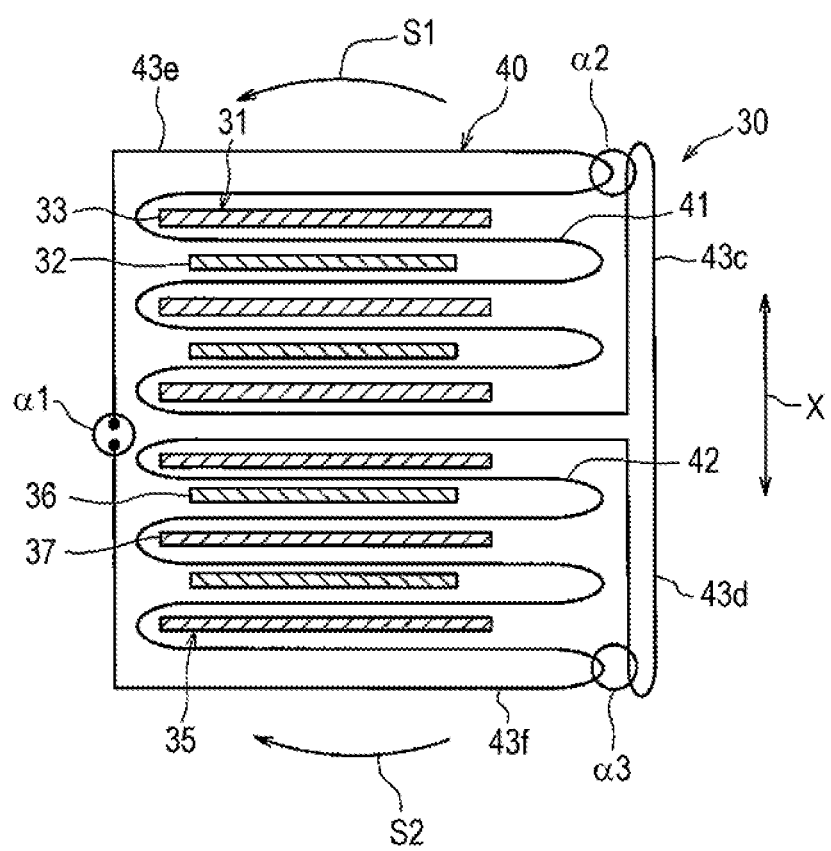
FIG. 8, corresponding to FIG. 3, illustrates another exemplary embodiment.

FIG. 8, corresponding to FIG. 3, illustrates another exemplary embodiment. The structure illustrated in FIG. 8 is different from the structure illustrated in FIGS. 7A and 7B in that a first wrapper portion 43c and a second wrapper portion 43d of the separator 40 are shorter than the first wrapper portion 43a and the second wrapper portion 43b (FIG. 7A). The first wrapper portion 43c is disposed, in the first electrode stack 31, on the outer side (right side in FIG. 8) of first ends of the positive electrodes 32 and 36 and the negative electrodes 33 and 37 in the longitudinal direction, and extends in the electrode stack direction X to cover these ends. The second wrapper portion 43d of the separator 40 is disposed, in the second electrode stack 35, on the outer side of first ends of the positive electrodes and the negative electrodes in the longitudinal direction, and extends in the electrode stack direction X to cover these ends.

The separator 40 also includes a third wrapper portion 43e and a fourth wrapper portion 43f. The third wrapper portion 43e is continuous with a portion of the first fanfold portion 41 disposed at the outer end of the first electrode stack 31, and is wrapped around the first electrode stack 31 in a first direction (direction of arrow S1 in FIG. 8). The fourth wrapper portion 43f is continuous with a portion of the second fanfold portion 42 disposed at the outer end of the second electrode stack 35, and is wrapped around the second electrode stack 35 in a second direction (direction of arrow S2 in FIG. 8). The far end portions (encircled portion α1 in FIG. 8) of the third wrapper portion 43e and the fourth wrapper portion 43f are bonded together. The base portion of the third wrapper portion 43e and the far end portion of the first wrapper portion 43c are bonded together at an encircled portion α2 in FIG. 8. In addition, the base portion of the fourth wrapper portion 43f and the far end portion of the second wrapper portion 43d are bonded together at an encircled portion α3 in FIG. 8. Other components and functions are the same as those of the structure in FIGS. 1 to 6 or the structure in FIGS. 7A and 7B.

Figure 9:
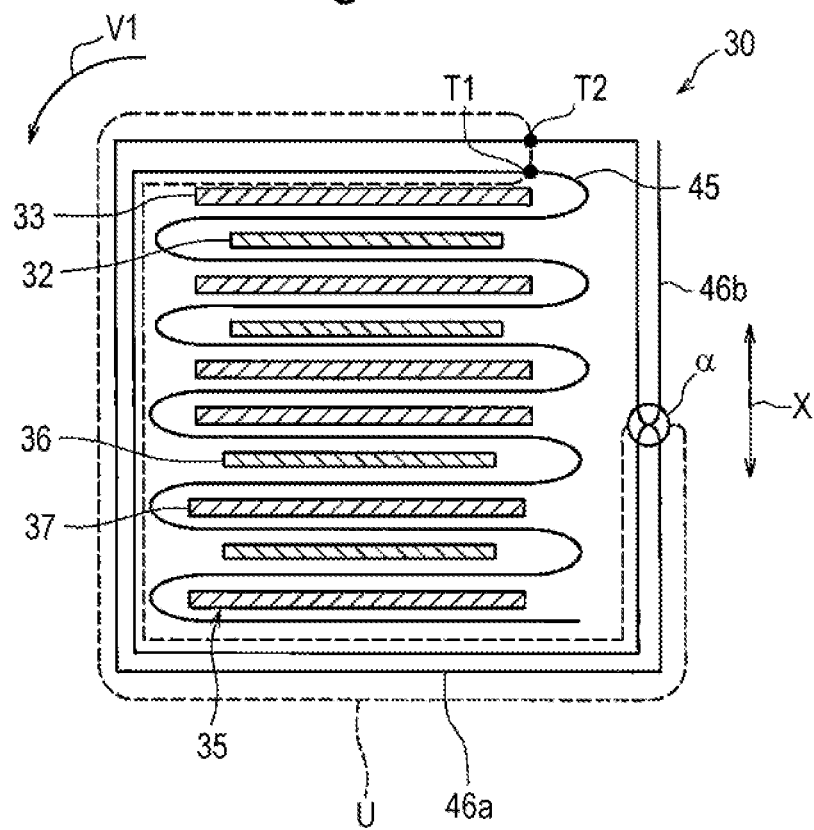
FIG. 9, corresponding to FIG. 3, illustrates another exemplary embodiment.

FIG. 9, corresponding to FIG. 3, illustrates another exemplary embodiment. The structure in FIG. 9 is different from the structure in FIGS. 1 to 6 in that the wrapper portion of the separator 40 does not extend from the space between the two electrode stacks 31 and 35. In the structure in FIG. 9, a fanfold portion 45 extends continuously between the positive electrodes 32 and 36 and the negative electrodes 33 and 37 of the first electrode stack 31 and the second electrode stack 35. The separator 40 includes a first wrapper portion 46a and a second wrapper portion 46b. The first wrapper portion 46a of the separator 40 is continuous with a first end T1 of the fanfold portion 45, disposed at a first end of the first electrode stack 31 (upper end in FIG. 9), and folded to have both side portions overlapping each other. The first wrapper portion 46a is illustrated in a portion enclosed with broken line U in FIG. 9. The first wrapper portion 46a is wrapped around the first electrode stack 31 and the second electrode stack 35 in the direction of arrow V1 in FIG. 9 to cover part of the peripheries of the first electrode stack 31 and the second electrode stack 35. The far end portion of the first wrapper portion 46a extends in the electrode stack direction X to cover first end portions (right end portions in FIG. 9), in the longitudinal direction perpendicular to the electrode stack direction X, of the positive electrodes 36 and the negative electrodes 37 of the second electrode stack 35.

The second wrapper portion 46b is a portion of the separator 40 that is continuous with a first end T2 of the base portion of the first wrapper portion 46a, and folded to have both side portions overlapping each other at the far end. The far end portion of the second wrapper portion 46b extends in the electrode stack direction X to cover first end portions (right end portion in FIG. 9), in the longitudinal direction perpendicular to the electrode stack direction X, of the positive electrodes 32 and the negative electrodes 33 of the first electrode stack 31. The far end portions of the first wrapper portion 46a and the second wrapper portion 46b are bonded together at an encircled portion α in FIG. 9. Other components and functions are the same as those in the structure in FIGS. 1 to 6.

Figure 10:
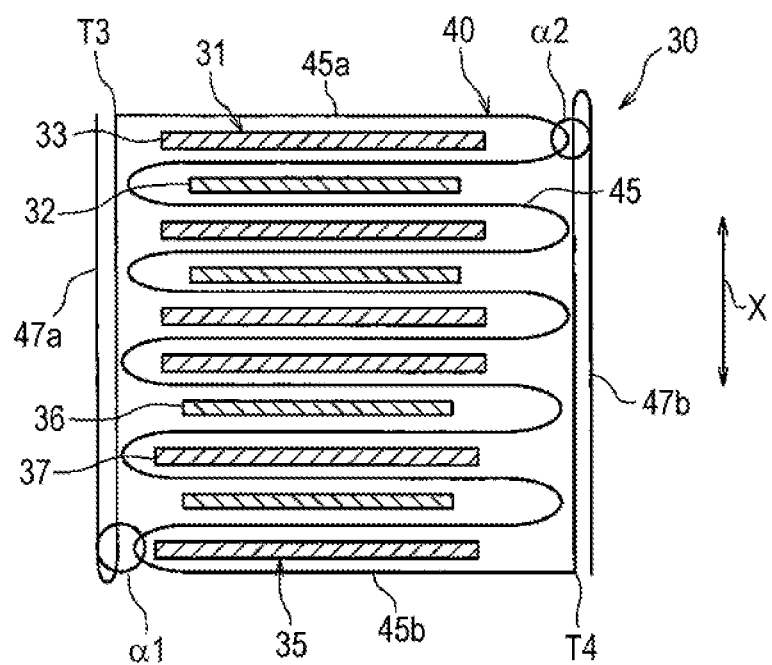
FIG. 10, corresponding to FIG. 3, illustrates another exemplary embodiment.

FIG. 10, corresponding to FIG. 3, illustrates another exemplary embodiment. The structure in FIG. 10 is different from the structure in FIG. 9 in that the fanfold portion 45 includes end portions 45a and 45b, which extend in the longitudinal direction of the positive electrodes 32 and 36 and the negative electrodes 33 and 37 (lateral direction in FIG. 10) to cover both ends of the first electrode stack 31 and the second electrode stack 35 in the electrode stack direction X. The separator 40 also includes a first wrapper portion 47a and a second wrapper portion 47b. The first wrapper portion 47a of the separator 40 is connected to a first end T3 of the end portion 45a of the fanfold portion 45, located at a first end of the first electrode stack 31. The first wrapper portion 47a is folded to have both side portions overlapping each other and extends in the electrode stack direction X to cover first end portions (left end portions in FIG. 10) of the positive electrodes 32 and 36 and the negative electrodes 33 and 37 in the longitudinal direction.

The second wrapper portion 47b of the separator 40 is connected to a second end T4 of the end portion 45b of the fanfold portion 45, located at a second end of the first electrode stack 31 and a second end of the second electrode stack 35. The second wrapper portion 47b is folded to have both side portions overlapping each other and extends in the electrode stack direction X to cover second end portions (right end portions in FIG. 10) of the positive electrodes and the negative electrodes in the longitudinal direction.

The far end portion of the first wrapper portion 47a and the side surface of the second end portion of the fanfold portion 45 are bonded together at an encircled portion α1 in FIG. 10. The far end portion of the second wrapper portion 47b and the side surface of the first end portion of the fanfold portion 45 are bonded together at an encircled portion α2 in FIG. 10. The first wrapper portion 47a and the second wrapper portion 47b are not stacked on the electrode stacks 31 and 35 in the electrode stack direction X.

In the above structure, the separator 40 has no overlapping portions at the outer ends, in the stack direction, of the portion in which the two electrode stacks 31 and 35 are stacked. This structure enables an increase of the number of the positive electrodes 32 and 36 and the negative electrodes 33 and 37 stacked in the electrode stack direction X of the electrode unit 30 within the limited space inside the secondary battery. This structure improves the energy density of the secondary battery. Other components and functions are the same as those in the structure of FIGS. 1 to 6 or the structure of FIG. 9.

Figure 11:
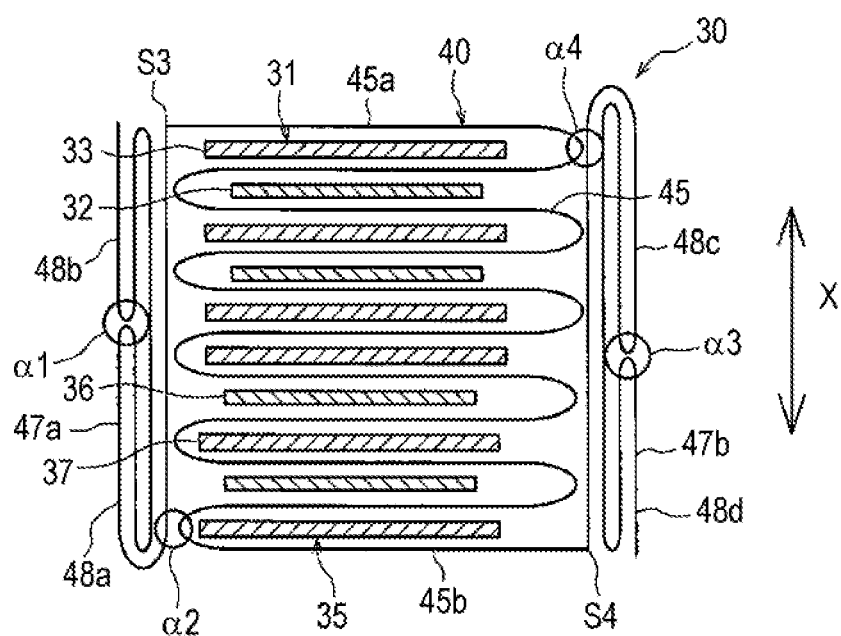
FIG. 11, corresponding to FIG. 3, illustrates another exemplary embodiment.

FIG. 11, corresponding to FIG. 3, illustrates another exemplary embodiment. The structure in FIG. 11 is different from the structure in FIG. 10 in that a first wrapper portion 47a includes a first folded-back portion 48a, formed by folding its far end portion outward by about half on the outer side (left side in FIG. 11) of first end portions of the positive electrodes 32 and 36 and the negative electrodes 33 and 37 in the longitudinal direction. The first wrapper portion 47a also includes a second folded-back portion 48b, formed by folding, by about half, its portion connected to a first end of the base portion of the first wrapper portion 47a and extending outward. The far end portions of the first folded-back portion 48a and the second folded-back portion 48b (an encircled portion α1 in FIG. 11) are bonded together. In the first wrapper portion 47a, a portion around the base portion of the first folded-back portion 48a and the side surface of the second end portion of the fanfold portion 45 are bonded together at an encircled portion α2 in FIG. 11.

The second wrapper portion 47b, on the other hand, includes a third folded-back portion 48c, formed by folding its far end portion outward by about half on the outer side (right side in FIG. 11) of the second end portions of the positive electrodes and the negative electrodes in the longitudinal direction. The second wrapper portion 47b also includes a fourth folded-back portion 48d, formed by folding, by about half, its portion connected to the first end of the base portion of the second wrapper portion 47b and extending outward. The far end portions (encircled portion α3 in FIG. 11) of the third folded-back portion 48c and the fourth folded-back portion 48d are bonded together. In the second wrapper portion 47b, a portion around the base portion of the third folded-back portion 48c and the side surface of the first end portion of the fanfold portion 45 are bonded together at an encircled portion α4 in FIG. 11.

The separator 40 having the above structure enables an increase of the number of stacked layers of the separator 40 disposed at the end portions in the longitudinal direction of the electrode unit 30, perpendicular to the electrode stack direction X of the electrode unit 30, and thus has high resistance to vibrations and shocks. Other components and functions are the same as those of the structure in FIG. 10.

FIG. 12 illustrates another exemplary embodiment. The structure in FIG. 12 is different from the structure in FIG. 4 in that it includes a positive electrode plate 39, inserted in a portion between the first electrode stack 31 and the second electrode stack 35 and from which the remaining portion 44 of the separator 40 extends. The positive electrode plate 39 has the same structure as the positive electrodes 32 and 36 of the electrode stacks 31 and 35. Positive electrode tabs (not illustrated) are bonded to a positive electrode current collector plate (not illustrated). The above structure enhances the battery capacity. Other components and functions are the same as those of the structure in FIGS. 3 and 4.

The above embodiments describe the structure of the electrode unit 30 including two electrode stacks 31 and 35. Each of the structures of the above embodiments except the structure in FIGS. 5 and 6 may be combined with a structure in which the electrode unit includes only one electrode stack and all the positive electrode tabs and negative electrode tabs are collected to first sides of the corresponding current collector plates to be welded thereto. For example, the wrapper portion of the separator may be wrapped to partially or entirely cover one electrode stack. Also in the structure including three or more electrode stacks, the wrapper portion of the separator may be wrapped to partially or entirely cover the electrode stacks.

The above embodiments describe the case where the nonaqueous electrolyte is a liquid electrolyte solution. Instead, the nonaqueous electrolyte may be a solid electrolyte including a gel polymer. This structure also increases the amount of the retained nonaqueous electrolyte and improves the performance in a long cycle.

The above embodiments describe the case where the exterior body is formed of a metal case 12. Instead, the exterior body may be a film exterior body formed by joining two laminate films together at the periphery to form a so-called pouched secondary battery.

INDUSTRIAL APPLICABILITY

The present invention is usable as a stack-type nonaqueous electrolyte secondary battery.

REFERENCE SIGNS LIST 10 stack-type nonaqueous electrolyte secondary battery (secondary battery)
12 case
13 case body
13a bottom plate portion
13b peripheral wall portion
14 cover plate
14a through hole
15 insulating plate
16 negative electrode terminal
17 positive electrode terminal
18a, 18b intermediate member
19 upper coupling member
20 insulating member
30 electrode unit
31 first electrode stack (electrode stack)
32 positive electrode
32a positive electrode tab
33 negative electrode
33a negative electrode tab
34 tab stack
35 second electrode stack
36 positive electrode
36a positive electrode tab
37 negative electrode
37a negative electrode tab
38 tab stack
39 positive electrode plate
40 separator
41 first fanfold portion (fanfold portion)
41a intervening element
41b coupling portion
41c end portion
42 second fanfold portion
42a intervening element
42b coupling portion
42c end portion
43 wrapper portion
43a first wrapper portion
43b second wrapper portion
43c first wrapper portion
43d second wrapper portion
43e third wrapper portion
43f fourth wrapper portion
44 remaining portion
44a first remaining portion
44b second remaining portion
45 fanfold portion
45a, 45b end portion
46a first wrapper portion
46b second wrapper portion
47a first wrapper portion
47b second wrapper portion
48a first folded-back portion
48b second folded-back portion
48c third folded-back portion
48d fourth folded-back portion 50 negative electrode current collector plate
60 electrolyte solution

The invention claimed is:

1. A stack-type nonaqueous electrolyte secondary battery, comprising:
   a first electrode stack housed in a first exterior body and including a plurality of first positive electrodes, a plurality of first negative electrodes, and a first separator,
   the plurality of the first positive electrodes and the plurality of the first negative electrodes being alternately arranged,
   the first separator including: a plurality of interposing portions interposed between the first positive electrodes and the first negative electrodes; a plurality of fanfold portions; and an extended portion including a first extended portion at one end of the first separator located on one side of the first electrode stack, and a second extended portion at another end opposite the one end of the first separator located on another side of the first electrode stack,
   wherein the extended portion includes a wrapper portion and the wrapper portion is disposed to cover at least part of a periphery of the first electrode stack,
   wherein the wrapper portion includes a first wrapper portion that is disposed to cover one end portion in a direction perpendicular to an electrode stack direction of the first electrode stack, and a second wrapper portion that is disposed to cover the other end portion in the direction perpendicular to the electrode stack direction of the first electrode stack,
   wherein the first wrapper portion includes a first overlapping portion formed by folding the first extended portion to 180°, and the second wrapper portion includes a second overlapping portion formed by folding the second extended portion to 180°, and
   wherein the first wrapper portion is connected to at least one of the plurality of the fanfold portions disposed on the one side of the first electrode stack, and the second wrapper portion is connected to at least one of the plurality of the fanfold portions disposed on the another side of the first electrode stack.

* * * * *